US007550889B2

(12) United States Patent
Horst (10) Patent No.: US 7,550,889 B2
(45) Date of Patent: Jun. 23, 2009

(54) ASYMMETRICAL COMPOSITE MAGNET STRUCTURE FOR LOBED ROTOR

(75) Inventor: Gary E. Horst, Manchester, MO (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 11/565,427

(22) Filed: Nov. 30, 2006

(65) Prior Publication Data

US 2007/0138892 A1  Jun. 21, 2007

Related U.S. Application Data

(63) Continuation-in-part of application No. 11/311,798, filed on Dec. 19, 2005.

(51) Int. Cl.
H02K 1/27 (2006.01)
(52) U.S. Cl. .................. 310/156.57; 310/156.56; 310/156.38; 310/156.43
(58) Field of Classification Search ........... 310/156.38, 310/43, 46, 156.53, 54, 56, 57
See application file for complete search history.

(56) References Cited

U.S. PATENT DOCUMENTS

| 5,945,760 | A | 8/1999 | Honda et al. |
| 5,990,593 | A | 11/1999 | Narita et al. |
| 6,239,525 | B1 | 5/2001 | Matsunobu et al. |
| 6,429,565 | B1 | 8/2002 | Matsunobu et al. |
| 6,664,688 | B2 | 12/2003 | Naito et al. |
| 6,727,627 | B1 | 4/2004 | Sasaki et al. |
| 6,741,002 | B2 | 5/2004 | Nishiyama et al. |
| 6,784,582 | B1 | 8/2004 | Kolomeitsev et al. |
| 6,885,125 | B2 * | 4/2005 | Inayama et al. ............ 310/216 |
| 6,940,205 | B1 * | 9/2005 | Murakami et al. .......... 310/254 |
| 7,233,092 | B2 * | 6/2007 | Murakami et al. .......... 310/216 |
| 2001/0043020 | A1 | 11/2001 | Nishiyama et al. |
| 2002/0047425 | A1 * | 4/2002 | Coupart et al. ......... 310/156.01 |
| 2004/0150282 | A1 | 8/2004 | Murakami et al. |
| 2006/0145556 | A1 * | 7/2006 | Aota et al. ............ 310/156.53 |
| 2007/0138892 | A1 * | 6/2007 | Horst .................... 310/156.53 |
| 2007/0284960 | A1 * | 12/2007 | Fulton et al. ........... 310/156.53 |

FOREIGN PATENT DOCUMENTS

| EP | 0911945 | A2 | 4/1999 |
| JP | 10290542 | A | 10/1998 |
| JP | 2000184640 | A | 6/2000 |
| JP | 2004328819 | A | * 11/2004 |
| JP | 2006325348 | A | 11/2006 |
| WO | 9419859 | A1 | 9/1994 |
| WO | 2006047519 | A2 | 5/2006 |

* cited by examiner

Primary Examiner—Quyen P Leung
Assistant Examiner—Naishadh N Desai
(74) Attorney, Agent, or Firm—Senniger Powers LLP (57) ABSTRACT

An interior permanent magnet electric motor. A lobed rotor comprising composite slots and non-composite slots radially spaced from its longitudinal axis of rotation extending parallel to the axis. Ferrite magnets are positioned in both the composite and non-composite slots and neo magnets are positioned in the composite slots only.

20 Claims, 11 Drawing Sheets

ASYMMETRICAL COMPOSITE MAGNET STRUCTURE FOR LOBED ROTOR

FIELD OF THE INVENTION

The present invention generally relates to an electric motor rotor design. More particularly, the present invention relates to an interior permanent magnet rotor design wherein strontium ferrite and neodymium-iron-boron are positioned in a common slot in a lobed rotor core.

BACKGROUND OF THE INVENTION

Interior permanent magnet (IPM) rotor designs using strontium ferrite (ferrite) and neodymium-iron-boron (neo) are known in the art.

In one prior art design, the rotor has a core with long thin slots having neo in each slot. This design does not make use of ferrite. The slots are formed by using a punch press on the rotor core. In order to increase die life, decrease the core weight, and reduce flux leakage, the slots are oversized. The oversized slots allow air spaces around the neo which cause the motor to have high windage noise at high speeds. These motors can have a sinusoidal back electromagnetic flux (EMF) which is desirable.

Another option is to use ferrite in an IPM rotor design. Ferrite is less expensive and can be used to fill large slots. This results in very small air spaces which correspond to a quieter motor. The problem with ferrite is that it does not have a sufficiently high flux density to make an efficient motor.

The combination of neo and ferrite in a single rotor design has been the solution. Large slots near the center of the rotor are filled with ferrite, and smaller slots closer to the edge of the rotor have pieces of neo in them. A motor employing this design is somewhat quieter than a motor using neo alone (i.e. has less windage noise), but generally has a non-sinusoidal back EMF (i.e., it is harmonically rich). Also, the die used in manufacturing this type of rotor has a short lifespan due to the small size of the neo slot.

SUMMARY OF THE INVENTION

According to one embodiment of the invention, an electric motor rotor comprises a core, first magnets, and second magnets. The core has a central longitudinal axis and a pair of opposing first slots radially spaced from the longitudinal axis and extending parallel to the axis. The longitudinal axis is positioned between the pair of first slots. The core has a pair of opposing second slots radially spaced from the longitudinal axis and extending parallel to the axis. The longitudinal axis is positioned between the pair of second slots. The first magnets extend parallel to the longitudinal axis and the first magnets are positioned in the first slots and positioned in the second slots. The second magnets extend parallel to the longitudinal axis and the second magnets are positioned within the first slots only. The second magnets are positioned between the first magnets and an outer surface of the core.

According to another embodiment of the invention, an electric motor comprises a rotor, a stator having windings in magnetic coupling relation to the rotor and a commutation circuit electrically connected to the windings. The rotor includes a core, first magnets and second magnets. The core has a central longitudinal axis, and a pair of opposing first slots radially spaced from the longitudinal axis and extending parallel to the axis. The longitudinal axis is positioned between the pair of first slots. The core has a pair of opposing second slots radially spaced from the longitudinal axis and extending parallel to the axis. The longitudinal axis is positioned between the pair of second slots. The first magnets extend parallel to the longitudinal axis and the first magnets are positioned in the first slots and positioned in the second slots. The second magnets extend parallel to the longitudinal axis and the second magnets are positioned within the first slots only. The second magnets are positioned between the first magnets and an outer surface of the core.

According to another embodiment of the invention, a method of producing an electric motor comprises:
forming a rotor core having a central longitudinal axis;
forming a pair of opposing first slots in the rotor core, the longitudinal axis located between the first slots;
forming a pair of opposing second slots in the rotor core, the longitudinal axis located between the second slots;
inserting a first magnet in each of the first and second slots;
inserting a second magnet in each of the first slots only, wherein the second magnet is positioned between the first magnet and an outer surface of the core;
inserting the rotor core into a stator has windings; and connecting the windings of the stator to a commutation circuit.

Alternatively, the invention may comprise various other methods and apparatuses.

Other objects and features will be in part apparent and in part pointed out hereinafter.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION OF THE INVENTION

Figure 1:
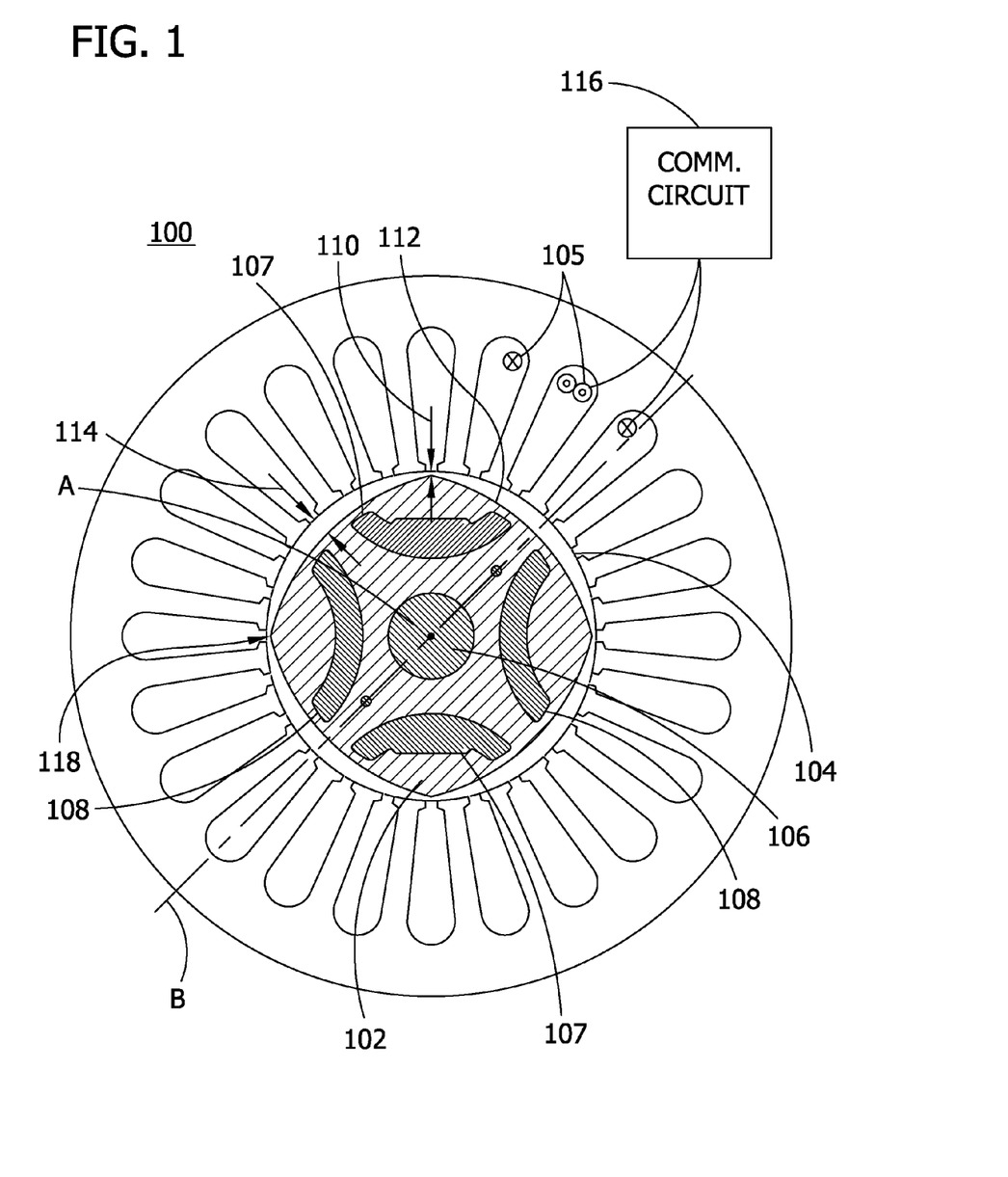
FIG. 1 is a partial cross sectional view perpendicular to an axis of rotation of a motor including a lobed rotor and a stator according to one embodiment of the invention, the rotor having two (2) composite slots for a first ferrite magnet and a second neo magnet wherein the slot is trapezoidal in the area of the second neo magnet and the rotor having two (2) other arc-shaped slots for a ferrite magnet.

Referring to FIG. 1, one embodiment of a motor 100 of the invention is illustrated in cross section including a rotor 102 positioned within a stator 104 having windings 105. The rotor 102 has a central shaft 106 rotating about an axis of rotation A. The rotor 102 comprises a core of steel (or other material) having two opposing composite slots 107 extending parallel to the shaft. The slots 107 are configured to receive a ferrite magnet and a neo magnet. The rotor 102 also has two arc-shaped non-composite slots 108 for receiving a ferrite magnet only. Thus, the rotor 102 is asymmetrical about a line B because the composite slots 107 are different in shape than the non-composite slots 108. This embodiment is illustrated without the magnets to better depict the cross section of slots.

An arc shaped ferrite magnet for use with this embodiment has a convex surface facing the central shaft 106 and a concave surface facing away from the central shaft 106. A neo magnet for use with this embodiment has a longer dimension facing the ferrite magnet, and either has the corners of the neo magnet contacting the concave face of the ferrite magnet (if the neo magnet is rectangular), or has one of the longer sides generally complementary to the concave face of the ferrite magnet and substantially in contact with the concave face of the ferrite magnet (if the neo magnet is bread-loaf shaped). The composite slots 107 are trapezoidal in cross section perpendicular to the axis of rotation forming generally triangular air spaces with the shorter edges of a neo magnet used in this embodiment. This trapezoidal slot reduces intricate details of the slot cross section which can increase the life of a die used to make the slot, making a trapezoidal slot desirable when die life is important to the manufacturer. The ferrite non-composite slots 108 are arc-shaped.

The windings 105 are connected to a commutation circuit 116. Commutation circuit 116 energizes the windings 114 causing the rotor 102 to rotate about the central shaft 104.

FIG. 1 illustrates one embodiment in which slots 107 have located therein neo and ferrite magnets each having a generally rectangular cross section perpendicular to the axis of rotation A. The magnets each have a longer rectangular dimension which is generally parallel to each other and the ferrite magnet is positioned between the neo magnet and the central shaft 104 (for example, see FIG. 2). In one embodiment, the composite slots 107 have a partial trapezoidal cross section perpendicular to the axis of rotation at the ends of the neo magnet. This results in generally triangular air spaces (see 210 of FIG. 2) bounded by the short side of the neo magnet, the long side of the ferrite magnet, and the rotor 102. Other rotor configurations are contemplated. For example, see the configurations illustrated below.

FIG. 1 illustrates an embodiment of the invention wherein the rotor 102 comprises a lobed core. A rotor with lobes 118 generally has reduced cogging torque and a more sinusoidal back EMF. The cross section of the core 102 is shown surrounded by the stator 104 forming a perfect circle. The outer edge 112 or surface of the core 102 is parallel to a longitudinal axis A and varies in distance from the inner edge of the stator 104. The distance 110 from the outer edge 112 of the core 102 to the inner edge of the stator 104 is generally less than the distance 114 from the outer edge 112 of the core 102 to the inner edge of the stator 104. In one embodiment, the distance 110 over a slot is 0.020" and the distance 114 not over a slot is 0.040". Embodiments of the invention may have lobes 118 over each slot in the rotor, or lobes 118 over selected slots in the rotor.

Generally, motors employing the invention have a substantially sinusoidal back EMF whereas motors known in the art using ferrite and neo magnets have a harmonically rich back EMF. Motors employing the invention generally have a lower minimum inductance than motors known in the art, and the ratio of maximum inductance to minimum inductance is generally higher which improves the contribution of reluctance torque. Motors employing the invention also generate less noise at high speeds than motors known in the art because there are less air spaces in the rotor.

Motors employing the invention are generally less expensive to manufacture than those known in the art, but there are compromises between cost and noise. Rectangular neo magnets are less expensive than neo magnets of other shapes, but they allow some air spaces when used with an arc shaped ferrite magnet. Two small neo magnets generally conform to the arc shaped ferrite magnet better than one large neo magnet. However, using two small magnets may require a die used to form slots in a rotor core to have intricate details which means that the die will not last as long as a die that has less intricate details. Die life can be increased by not conforming to every detail of the magnets, but this will allow for air spaces which will increase acoustic noise when the motor is operating at high speeds. Because of their reduced cost, reduced acoustic noise, and reduced electrical noise, motors according to the invention may be advantageously applied in consumer appliances such as horizontal washing machines, dish washers and clothes dryers.

Figure 2:
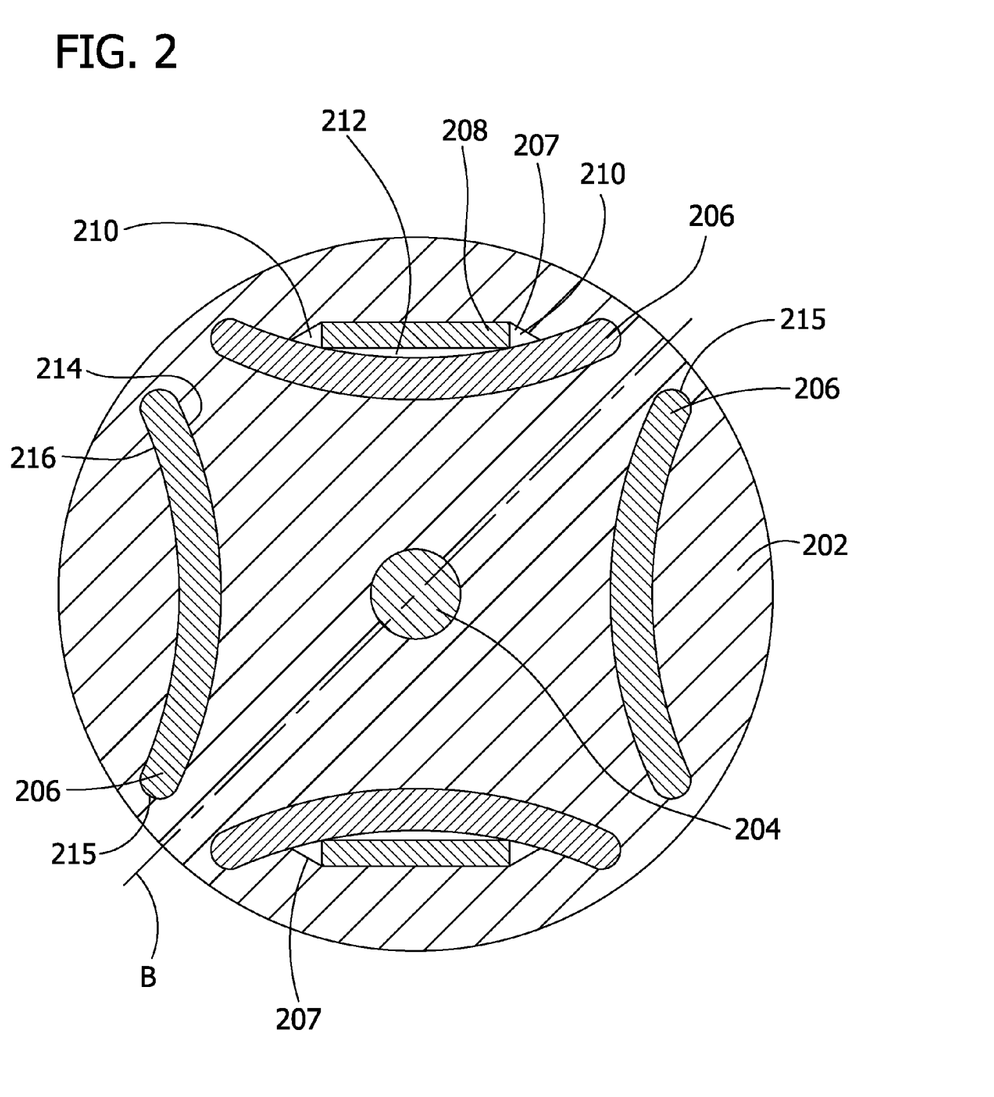
FIG. 2 is a cross sectional view perpendicular to an axis of rotation of a rotor according to one embodiment of the invention having two (2) composite slots for a first ferrite magnet and a second neo magnet wherein the slot is trapezoidal in the area of the second neo magnet and the rotor having two (2) other arc-shaped slots for a ferrite magnet.

Referring now to FIG. 2, an embodiment of the invention using a rectangular neo magnet 208, an arc shaped ferrite magnet 206, a trapezoidal composite slot 207, and a non-composite arc-shaped slot 215 is shown. A core 202 has a central shaft 204 with a longitudinal axis A about which it rotates and the slots 207 and 215 extend parallel to the shaft 204. The arc shaped ferrite magnet 206 has a convex surface 214 facing the central shaft 204 and a concave surface 216 facing away from the central shaft 204. Thus, core 202 has the central longitudinal axis A with the pair of opposing [first] composite slots 207 radially spaced from the longitudinal axis A and extending parallel to the axis. The longitudinal axis A is positioned between the pair of first slots 207. The core 202 also has a pair of opposing [second] non-composite slots 215 radially spaced from the longitudinal axis A and extending parallel to the axis. The longitudinal axis is positioned between the pair of second slots 215. The ferrite [first] magnets 206 extend parallel to the longitudinal axis A and are positioned in the first slots 207 and positioned in the second slots 215. The neo [second] magnets 208 extend parallel to the longitudinal axis A and are positioned within the first slots 207 only, not in the second slots. Thus, the second magnets 208 are positioned between the first magnets 206 and an outer surface of the core 218.

In composite slot 207, the rectangular neo magnet 208 has a longer dimension facing the ferrite magnet 206, and the corners of the neo magnet 208 contact the concave face 216 of the ferrite magnet 206. The concave surface 216 of the ferrite magnet 206 facing the flat surface of the neo magnet 208 results in an air space 212 between the ferrite magnet 206 and the neo magnet 208. The slot 207 is not precision cut, but is trapezoidal in the area that contains the neo magnet 208. That is, instead of fitting tightly against the outline of the combined ferrite and neo magnets, the core is cut so that it does not fit against the shorter edges of the neo magnet 208. A trapezoidal slot results in generally triangular air spaces 210 bounded by the short sides of the rectangular neo magnet 208, the concave face 216 of the ferrite magnet 206, and the core 202. This trapezoidal style slot reduces intricate details of the slot cross section which can increase the life of a die used to make the slot, making a trapezoidal slot desirable when die life is more important to the manufacturer than motor noise is to the end user. The trapezoidal slot also reduces leakage flux which contributes to a motor with a higher maximum inductance, and thus a potentially better ratio of maximum inductance to minimum inductance. Similarly, the non-composite, arc-shaped slot 215 is not precision cut and receives only the ferrite magnet 206. Although not illustrated in FIG. 2, it is contemplated that the core 202 is lobed, although a cylindrical core as illustrated may be optionally employed. The core 202 is asymmetrical about line B because the slots 207 are different in shape than the slots 215.

Figure 3:
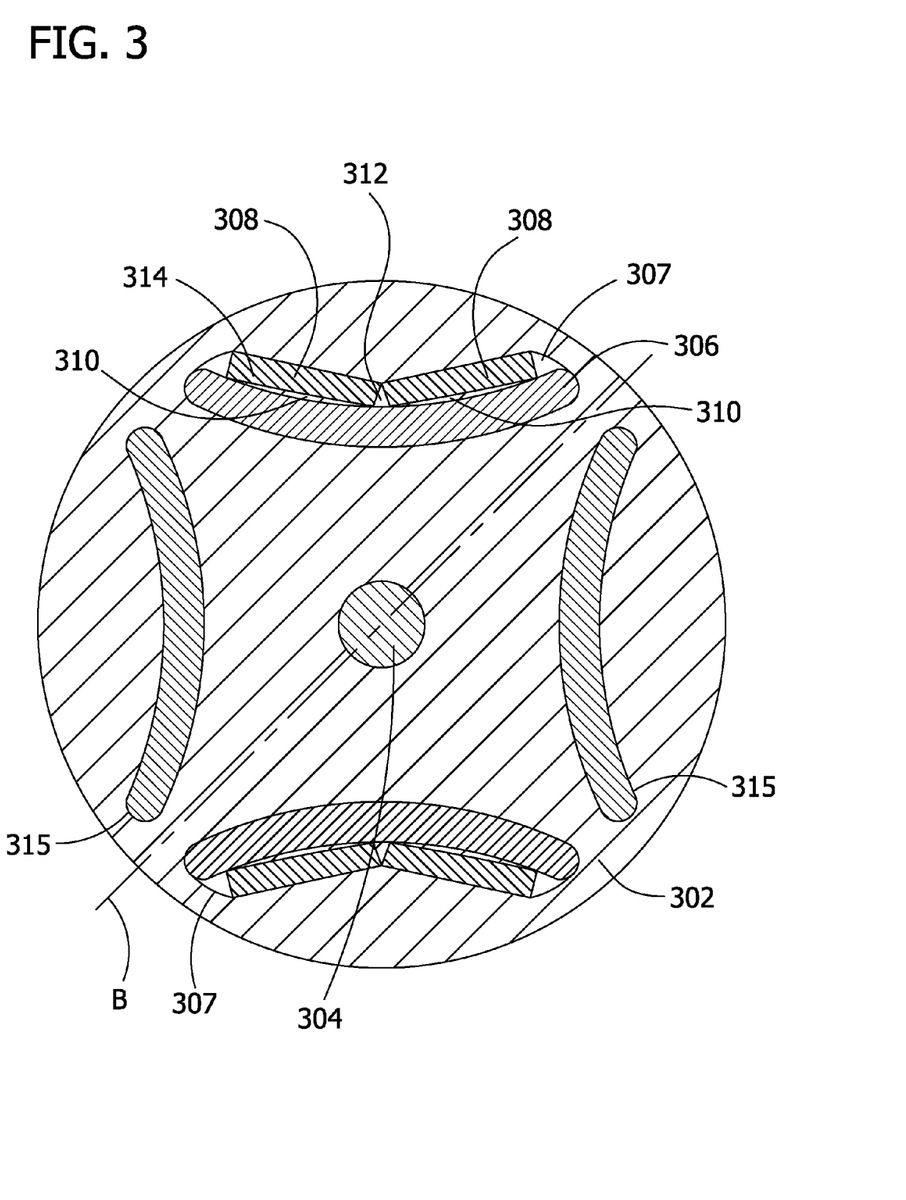
FIG. 3 is a cross sectional view perpendicular to an axis of rotation of a rotor according to one embodiment of the invention having two composite trapezoidal slots for an arc shaped ferrite magnet and two contiguous rectangular pieces of a neo magnetic material, and two arc-shaped slots for a ferrite magnet, this arrangement called a dual neo consequent configuration.

Referring now to FIG. 3, an embodiment of the invention using two rectangular neo magnets 308 and an arc shaped ferrite magnet 306. A pair of opposing trapezoidal slots 307 receive the neo and ferrite magnets whereas a pair of opposing slots 315 receive only the ferrite magnets. A core 302 has a central shaft 204 about which it rotates and a slot extending parallel to the shaft 304. The arc shaped ferrite magnet 306 has a convex surface facing the central shaft 304 and a concave surface facing away from the central shaft 304. Each rectangular neo magnet 208 has a longer dimension facing the ferrite magnet 206, and the corners of the neo magnet 308 contact the concave face of the ferrite magnet 306. The neo magnets 308 contact each other at one corner. The concave surface of the ferrite magnet 306 facing the flat surface of the neo magnets 308 results in air spaces 310 between the ferrite magnet 306 and each neo magnet 308. There is also a generally triangular air space 312 between the two neo magnets 308 bound by the concave surface of the ferrite magnet 306 and the shorter sides of each neo magnet 308. The slot is generally trapezoidal in cross section and triangular in cross section in the area that contains the neo magnets 308. That is, instead of fitting tightly against the outline of the combined ferrite and neo magnets, the core may be cut so that it does not have a precision fit with the shorter edges of the neo magnet 208. A trapezoidal slot results in generally triangular air spaces 314 bounded by the short side of the rectangular neo magnet 308, the concave face of the ferrite magnet 306, and the core 302. Air spaces 310 and 312 may be smaller than air space 212 (see FIG. 2) because two smaller neo magnets conform to the face of the ferrite magnet better than one large neo magnet. The rotor design of FIG. 3 has different acoustic characteristics than that of the design in FIG. 2 because of the difference in air spaces. The two rotors (see FIGS. 2 and 3) may be employed in different applications with different operating speeds because of their differing acoustical characteristics (i.e., reduced windage noise at certain speeds). Although not illustrated in FIG. 3, it is contemplated that the core 302 is lobed, although a cylindrical core as illustrated may be optionally employed. The core 302 is asymmetrical about line B because the slots 307 are different in shape than the slots 315.

Figure 4:
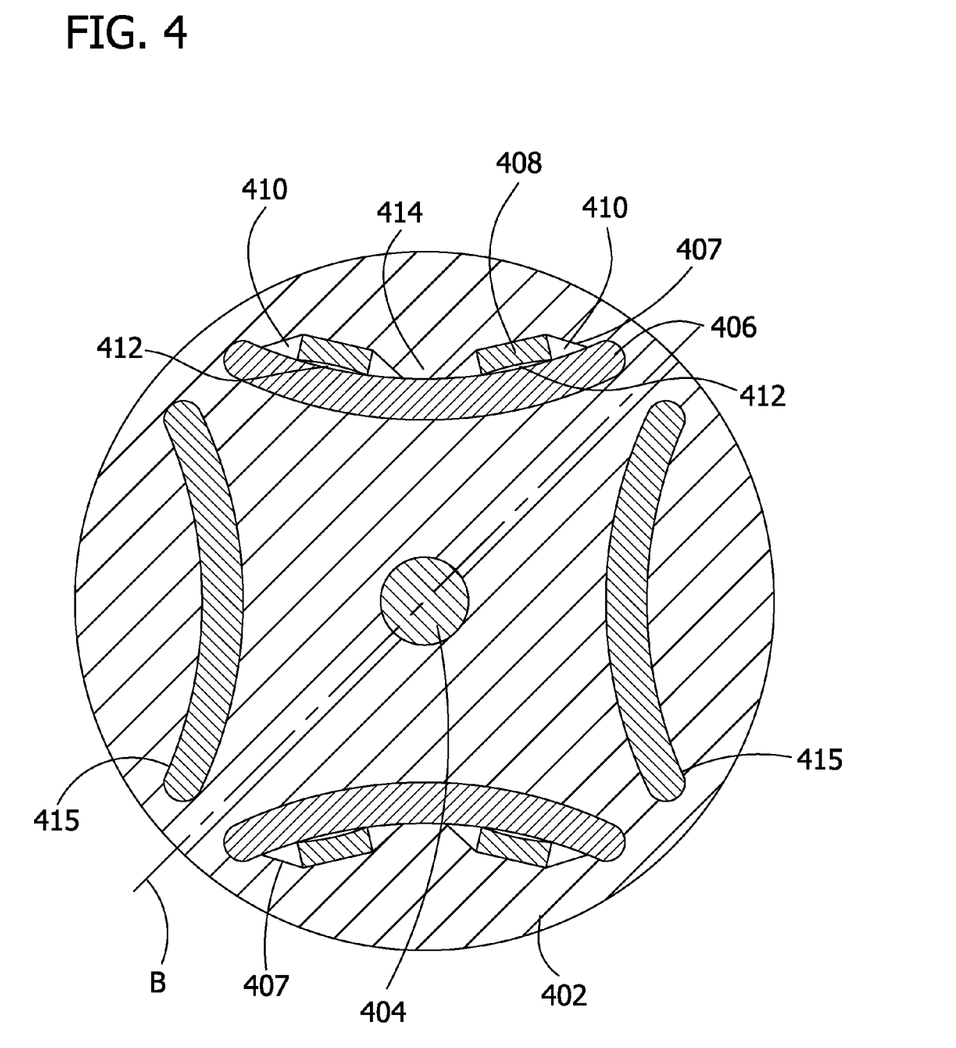
FIG. 4 is a cross sectional view perpendicular to an axis of rotation of a rotor according to one embodiment of the invention having slots for receiving arc shaped ferrite magnets, two of slots being composite slots for receiving separated rectangular pieces of a neo magnetic material in trapezoidal slots.

Referring now to FIG. 4, an embodiment of the invention using two rectangular neo magnets 408 and an arc shaped ferrite magnet 406 in each of opposing trapezoidal composite slots 407, whereas only an arc shaped ferrite magnet 406 is positioned within each of opposing non-composite slots 415. A core 402 has a central shaft 404 about which it rotates and a slot extending parallel to the shaft 404. The arc shaped ferrite magnet 406 has a convex surface facing the central shaft 404 and a concave surface facing away from the central shaft 404. The two rectangular neo magnets 408 each have a longer dimension facing the ferrite magnet 406, and the corners of the neo magnets 408 contact the concave face of the ferrite magnet 406. The concave surface of the ferrite magnet 406 facing the flat surfaces of the neo magnets 408 results in air spaces 412 between the ferrite magnet 406 and the neo magnets 408. Two small neo magnets 408 conform to the concave face of the ferrite magnet 406 better than one large neo magnet thus reducing the air spaces 412 between the neo magnets 408 and the ferrite magnet 406 which tends to provide a quieter rotor design. The neo magnets 408 are spaced apart from each other by a portion of the core 414. Spacing the neo magnets 408 apart from each other allows them to be positioned in the slot more securely. The slot 405 is trapezoidal in each area that contains each neo magnet 408. That is, instead of fitting tightly against the outline of the combined ferrite and neo magnets, the core is cut so that it does not fit against the shorter edges of the neo magnets 408. The trapezoidal slot results in generally triangular air spaces 410 bounded by the short sides of the rectangular neo magnets 408, the concave face of the ferrite magnet 406, and the core 402. This trapezoidal style slot reduces intricate details of the slot cross section which can increase the life of a die used to make the slot, making a trapezoidal slot desirable when die life is more important to the manufacturer than motor noise is to the end user. This embodiment thus allows longer die life and secure positioning of two relatively small neo magnets 408 which is cost effective regarding die life and minimizes motor noise (as compared to a design utilizing one large neo magnet). Although not illustrated in FIG. 4, it is contemplated that the core 402 is lobed, although a cylindrical core as illustrated may be optionally employed. The core 402 is asymmetrical about line B because the slots 407 are different in shape than the slots 415.

Figure 5:
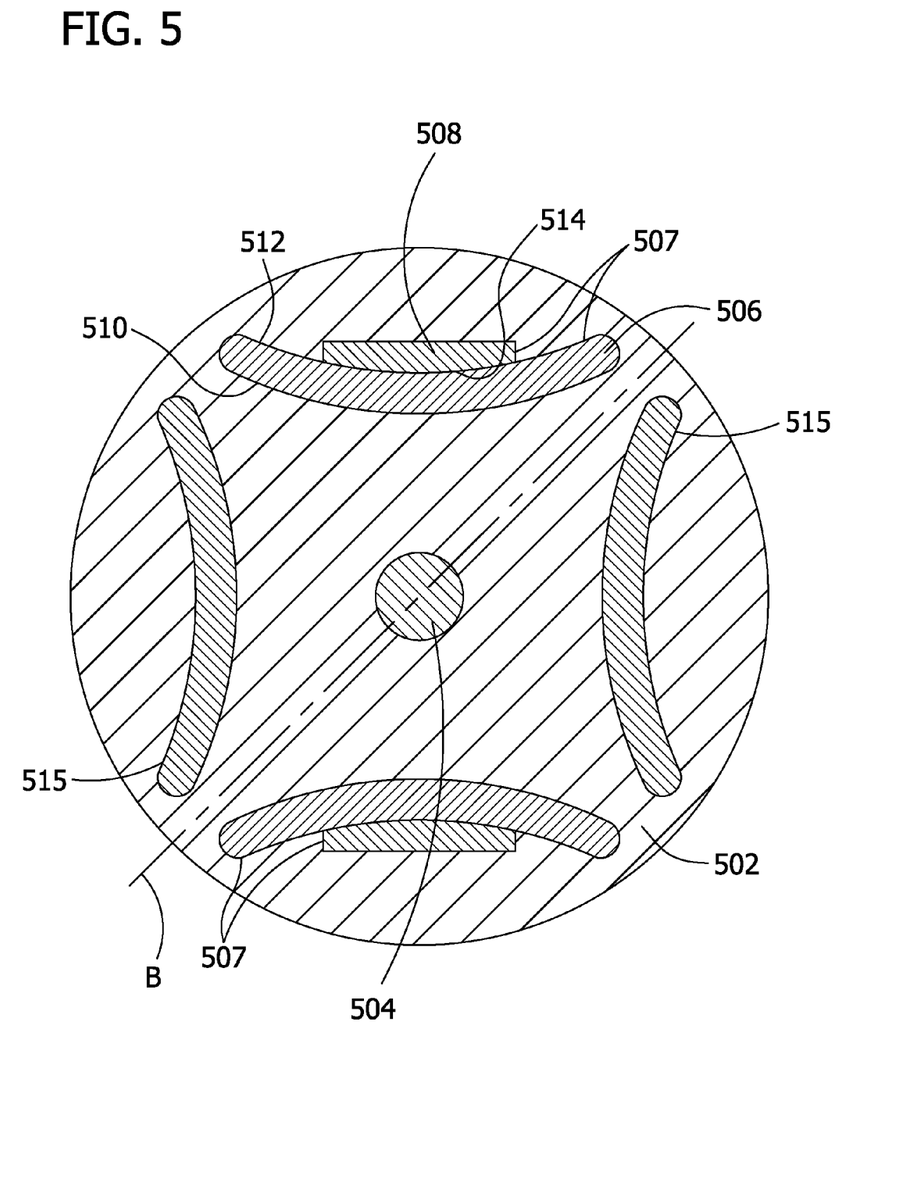
FIG. 5 is a cross sectional view perpendicular to an axis of rotation of a rotor according to one embodiment of the invention having two slots for receiving an arc shaped ferrite magnet and having two composite slots for receiving a bread loaf shaped neo magnet and an arc shaped ferrite magnet, each slot being a precision slot.

Referring now to FIG. 5, an embodiment of the invention using a bread-loaf shaped neo magnet 508 and an arc shaped ferrite magnet 506 in precision cut composite slot 507 is shown. Only a ferrite magnet 506 is in non-composite slot 515. A core 502 has a central shaft 504 about which it rotates and a slot extending parallel to the shaft 504. The arc shaped ferrite magnet 506 has a convex surface 510 facing the central shaft 504 and a concave surface 512 facing away from the central shaft 504. A bread-loaf shaped neo magnet 508 is generally rectangular; however, one of the longer sides is generally complementary to the concave face 512 of the ferrite magnet 506. The curved side of the neo magnet 508 is substantially in contact with the concave face 512 of the ferrite magnet 506. The precision cut slots 505 are an alterative to a slot that is trapezoidal or triangular in the area of the neo magnet. The slot 505 is precision cut to accept the ferrite magnet 506 and neo magnet 508 while maintaining a minimum air space between the ferrite and neo magnets and between each magnet and the rotor core. This means that the core 502 fits tightly against the outline of the combined neo and ferrite magnets. This embodiment has essentially no air spaces either between the two magnets or between the magnets and the core and thus is quiet when operating at high speeds. However, the large bread-loaf shaped neo magnet 508 and precision slot mean that this embodiment may be one of the more expensive to manufacture due to shortened die life and increased neo magnet expense. Also, embodiments utilizing a precision slot generally have a lower maximum inductance than embodiments utilizing a trapezoidal slot which means that such embodiments may not be as efficient as other embodiments. Although not illustrated in FIG. 5, it is contemplated that the core 502 is lobed, although a cylindrical core as illustrated may be optionally employed. The core 502 is asymmetrical about line B because the slots 507 are different in shape than the slots 515.

Figure 6:
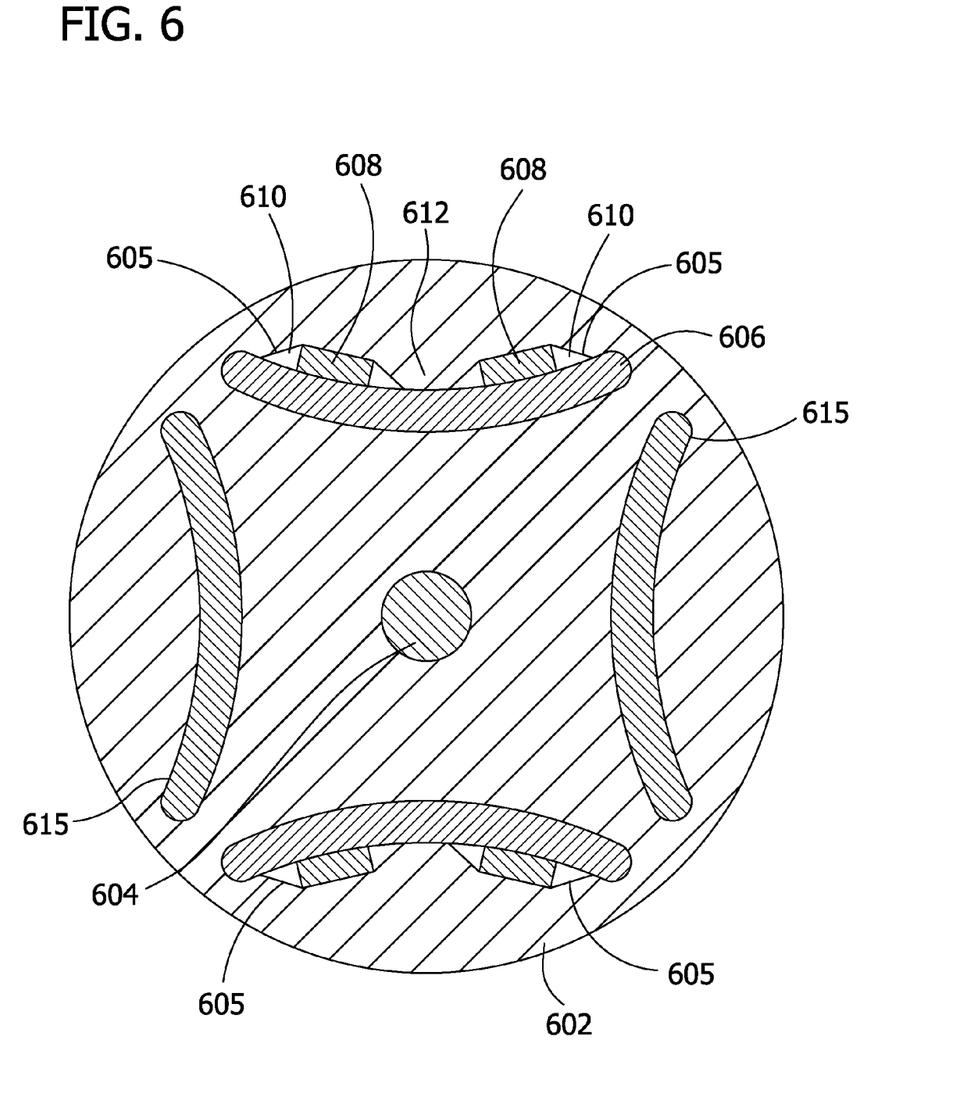
FIG. 6 is a cross sectional view perpendicular to an axis of rotation of a rotor according to one embodiment of the invention having two composite slots for receiving an arc shaped ferrite magnet and two separated bread loaf shaped pieces of a neo magnetic material in a trapezoidal slot and two non-composite slots for receiving arc shaped ferrite magnets.

Referring now to FIG. 6, an embodiment of the invention using two bread-loaf shaped neo magnets 608 and an arc shaped ferrite magnet 606 in trapezoidal composite slot 605. Only a ferrite magnet 606 is in non-composite slot 615. A core 602 has a central shaft 604 about which it rotates and a slot extending parallel to the shaft 604. The arc shaped ferrite magnet 606 has a convex surface facing the central shaft 604 and a concave surface facing away from the central shaft 604. Bread-loaf shaped neo magnets 608 are generally rectangular; however, one of their longer sides is complementary to the concave face of the ferrite magnet 606. The curved side of each neo magnet 508 is substantially in contact with the concave face of the ferrite magnet 606. The neo magnets 608 are spaced apart from each other. The slots are not precision cut, but slot 605 is trapezoidal in the area that contains the neo magnets 608. That is, instead of fitting tightly against the outline of the combined ferrite and neo magnets, the core is cut so that it does not fit tightly against the shorter edges of the neo magnets 608. The trapezoidal slot results in generally triangular air spaces 610 bounded by the short sides of the rectangular neo magnets 608, the concave face of the ferrite magnet 606, and the core 602. This trapezoidal style slot reduces intricate details of the slot cross section which can increase the life of a die used to make the slot, making a trapezoidal slot desirable when die life is more important to the manufacturer than motor noise is to the end user. This embodiment allows for longer die life, secure positioning of two relatively small neo magnets, and reduced air spaces as compared to the embodiment illustrated in FIG. 4. Although not illustrated in FIG. 6, it is contemplated that the core 602 is lobed, although a cylindrical core as illustrated may be optionally employed. The core 602 is asymmetrical about line B because the slots 607 are different in shape than the slots 615.

Figure 7:
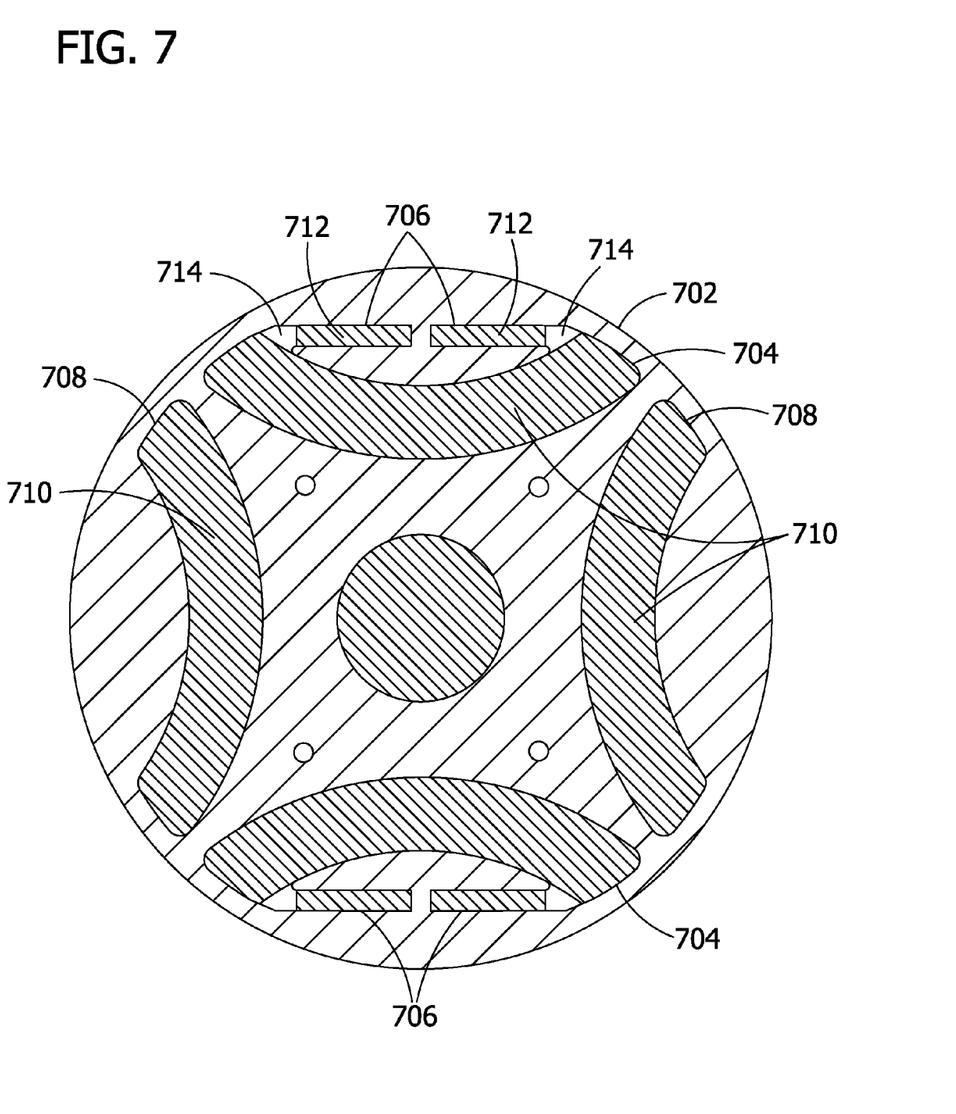
FIG. 7 is a cross sectional view perpendicular to an axis of rotation of a rotor according to one embodiment of the invention having two composite slots for receiving an arc shaped ferrite magnet with contiguous rectangular slots for receiving neo magnets, and two non-composite slots for receiving arc shaped ferrite magnets, this arrangement called a consequent T configuration.

FIG. 7 is a cross sectional view perpendicular to an axis of rotation of a rotor 702 according to one embodiment of the invention having a composite slot comprising an arc shaped slot 704 for a ferrite magnet contiguous with rectangular slots 706 for the neo magnets. The non-composite slot comprises an arc shaped slot 708 for a ferrite magnet only. This configuration called a consequent T. Thus, rotor 702 comprises arc-shaped composite slots 704 having ends, each of which terminates in rectangular slot 706. Rotor 702 also comprises arc-shaped non-composite slots 708. Ferrite magnets 710 are positioned within the arc-shaped slots 704 and 708 and neo magnets 712 are positioned with the rectangular slots 706. An air gap 714 may optionally be formed between the ferrite magnets 710 and the neo magnets 712.

Figure 8:
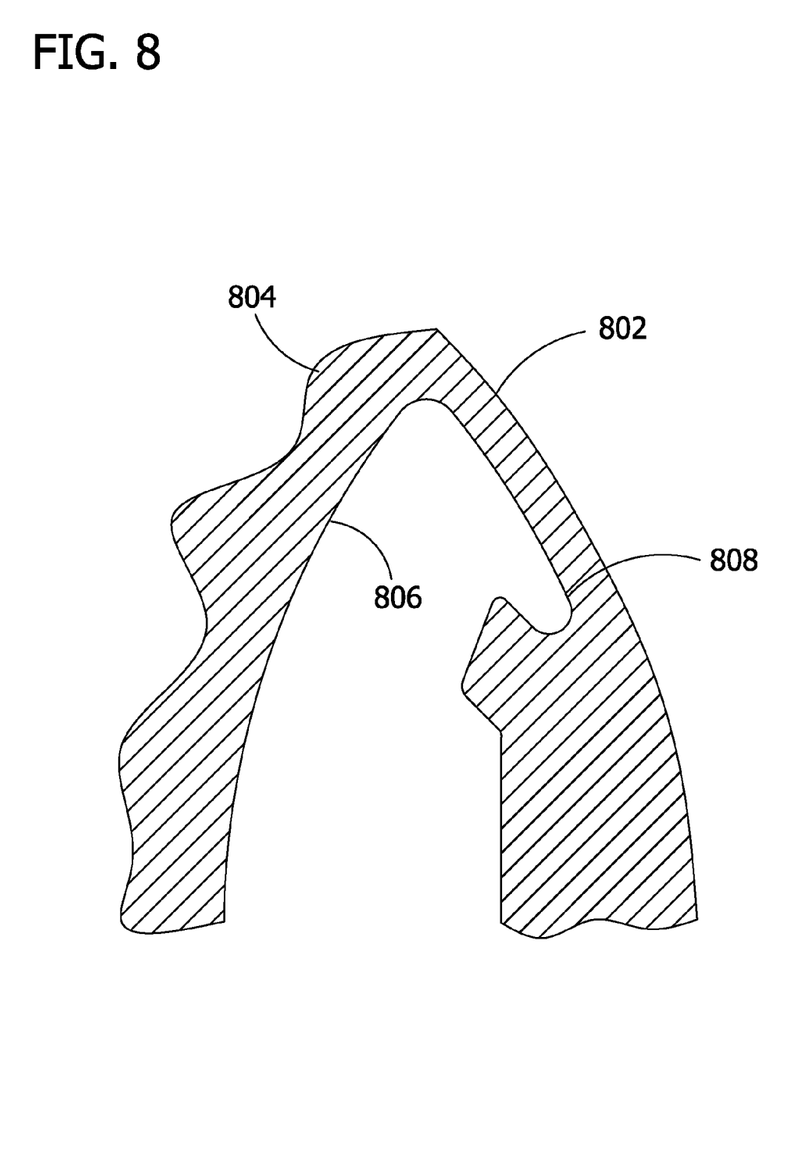
FIG. 8 is a partial cross sectional view perpendicular to an axis of rotation of an edge of a rotor according to one embodiment of the invention showing part of a composite slot for receiving an arc shaped ferrite magnet and one or more rectangular or bread loaf neo magnets in a trapezoidal portion of the composite slot, wherein the slot terminates in a rounded-off end slot.
Figure 9:
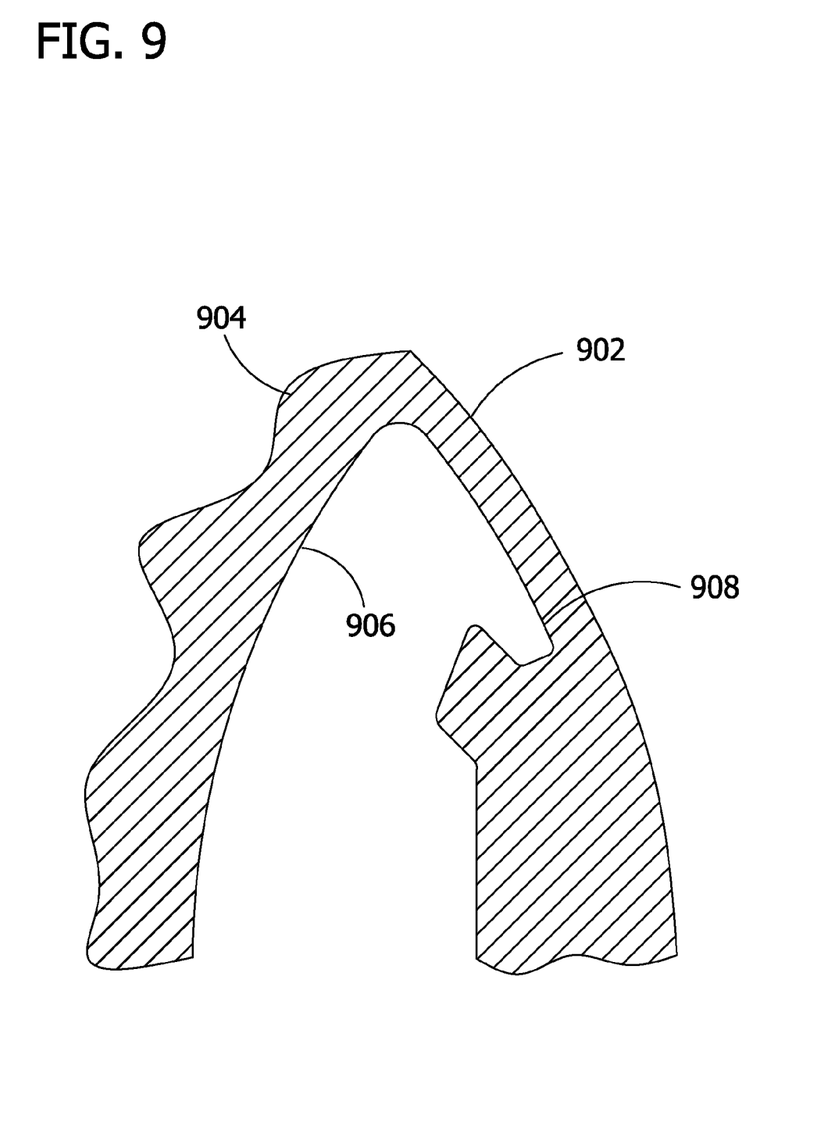
FIG. 9 is a partial cross sectional view perpendicular to an axis of rotation of an edge of a rotor according to one embodiment of the invention showing part of a composite slot for receiving an arc shaped ferrite magnet and one or more rectangular or bread loaf neo magnets in a trapezoidal portion of the composite slot, wherein the slot terminates in a squared-off end slot.

Referring to FIG. 8 and 9, FIG. 8 is a partial cross sectional view perpendicular to an axis of rotation of an edge 802 of a rotor 804 according to one embodiment of the invention showing part of an arc shaped composite slot 806 for receiving the ferrite and neo magnets. Slot 806 terminates in a rounded-off end slot 808. FIG. 9 is a partial cross sectional view perpendicular to an axis of rotation of an edge 902 of a rotor 904 according to one embodiment of the invention showing part of an arc shaped composite slot 906 for receiving the ferrite and neo magnets. Slot 906 terminates in a squared-off end slot 908.

Thus, rotor 804, 904 include end slots 808, 908 which are contiguous with the slots 806, 906, respectively. In one embodiment, the end slots 808, 908 comprise an air gap. Optionally, the end slots 808, 908 comprise elongated slots radially spaced from a longitudinal axis of the rotor 804,904 and extending tangentially relative to an outer surface or edge 802, 902 of the rotor 804, 904, respectively.

Figure 10:
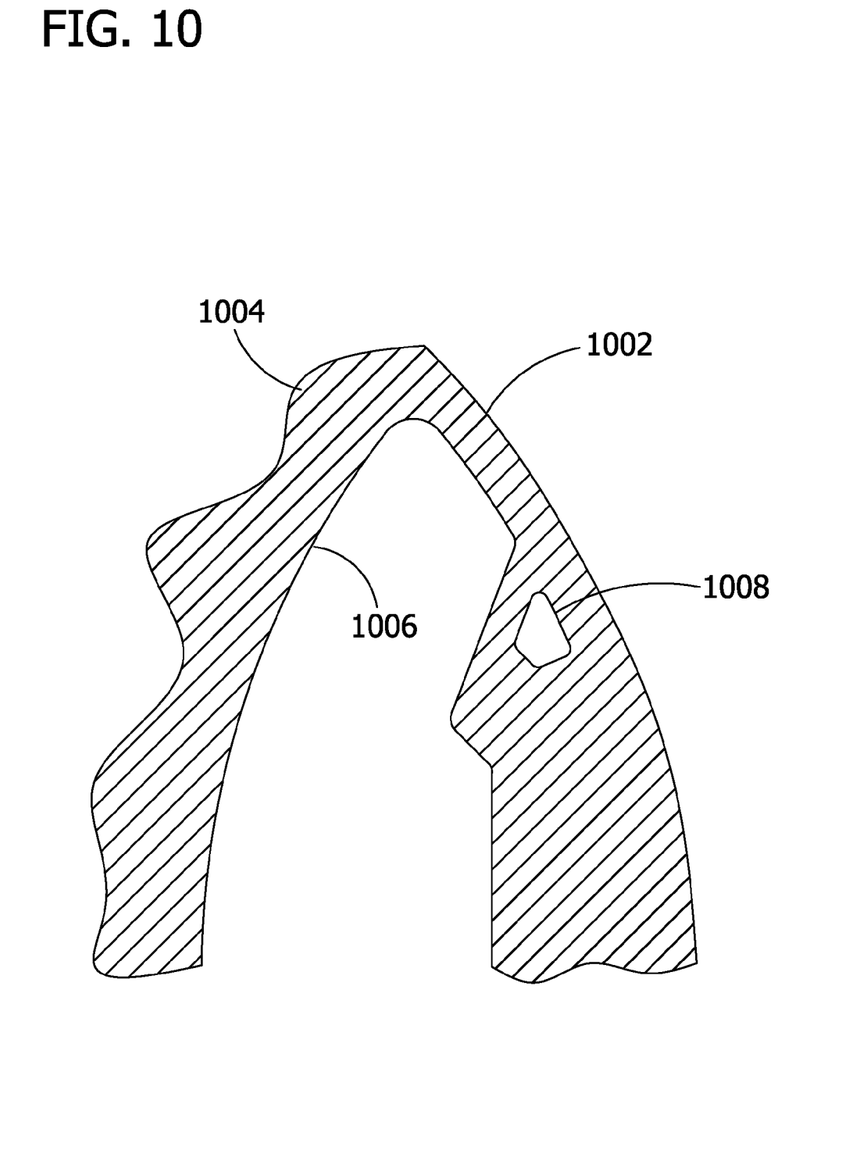
FIG. 10 is a partial cross sectional view perpendicular to an axis of rotation of an edge of a rotor according to one embodiment of the invention showing part of a composite slot for receiving an arc shaped ferrite magnet and one or more rectangular or bread loaf neo magnets in a trapezoidal portion of the composite slot, wherein an end opening adjacent to the slot is provided.

FIG. 10 is a partial cross sectional view perpendicular to an axis of rotation of an edge 1002 of a rotor 1004 according to one embodiment of the invention showing part of an arc shaped composite slot 1006 for receiving the ferrite and neo magnets. An end opening 1008 is positioned adjacent to the slot 1006. Thus, rotor 1004 has an end opening 1008 adjacent to the slot 1006 and spaced from the slot 1006 so that the end opening 1008 is not contiguous with the slot 1006. Optionally, the end opening 1008 forms an air space.

Alternatively, it is contemplated that various embodiments may be implemented in a symmetric rotor which is not lobed. For example, the embodiments of FIGS. 8, 9 and 10 may be employed in each and every slot of a symmetric rotor. Thus, in one embodiment, an electric motor rotor 804, 904, 1004 comprises a core having pairs of first and second slots 806, 906, 1006 radially spaced from a longitudinal axis and extending parallel to the axis wherein said longitudinal axis is positioned between the pair of first slots. Strontium ferrite magnets extending parallel to the longitudinal axis are positioned in the first and second slots 806, 906, 1006. Neodymium-iron-boron magnets extending parallel to the longitudinal axis are also positioned in the first and second slots 806, 906, 1006 such that the neodymium-iron-boron magnets are positioned between the strontium ferrite magnets and an outer surface 802, 902, 1002 of the rotor core.

In one embodiment, the core has end slots 808, 908 which are contiguous with the slots 806, 906, respectively, and form an air space. In another embodiment, the core has end openings 1008 adjacent to the slots 1006 and spaced from the slots 1006, respectively, so that the end openings 1008 are not contiguous with the slots 1006 and form an air space.

In another embodiment, the end slots comprise elongated slots (see slots 706 in FIG. 7, for example) which are radially spaced from the longitudinal axis and extend tangentially relative to the outer surface 802, 902, 1002 of the rotor core.

Figure 11:
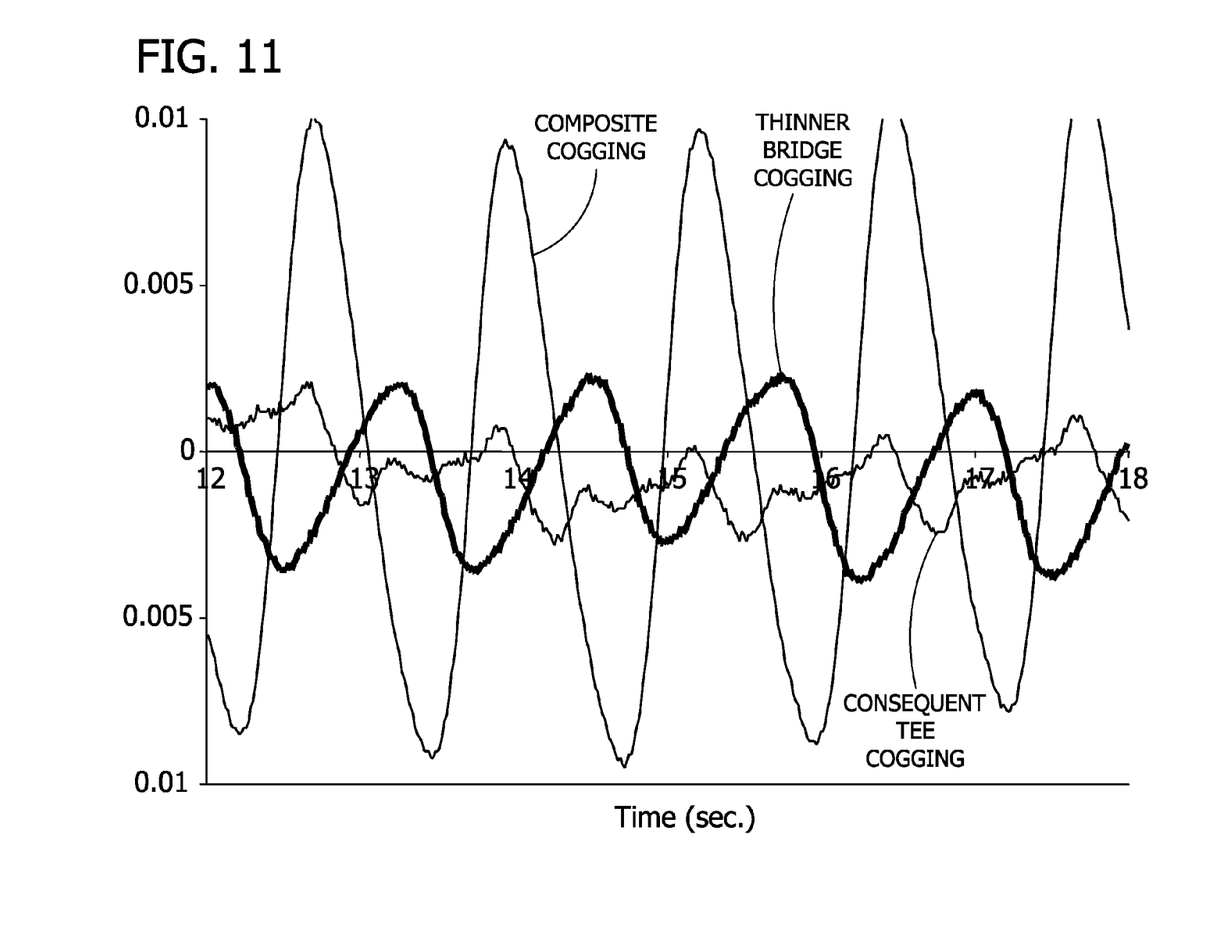
FIG. 11 is a graph illustrating a cogging comparison of a 62 mm bore, 24 slot, 4 pole motor having composite slots in dual neo and consequent T configurations.

FIG. 11 is a graph illustrating a cogging comparison of a 62 mm bore, 24 slot, 4 pole motor having three different configurations. A first configuration is the composite configuration illustrated in co-pending U.S. patent application Ser. No. 11/311,798 entitled COMPOSITE MAGNET STRUCTURE FOR ROTOR, filed Dec. 19, 2005. The line labeled composite cogging shows that this first configuration has a cogging torque in the range of ±0.010 NM. A second configuration is the dual neo configuration illustrated in FIG. 3. The line labeled dual neo consequent cogging shows that this second configuration has a cogging torque in the range of ±0.005 NM, which is less than the cogging torque of the first, composite configuration. A third configuration is the consequent T configuration illustrated in FIG. 7. The line labeled consequent TEE cogging shows that this third configuration has a cogging torque in the range of ±0.003 NM, which is less than the cogging torque of the first, composite configuration.

The following table 1 illustrates the back electromotive force (emf) at 1000 rpms of the composite, dual neo consequent and consequent Tee configurations.

TABLE 1

|  | Back EMF @ 1000: P—P |
|---|---|
| Composite | 85.5 |
| dual neo consequent (FIG. 3) | 88.5 |
| Consequent Tee (FIG. 7) | 86.7 |

The following table 2 illustrates the minimum inductance, the maximum inductance and the ratio thereof of the composite, dual neo and consequent Tee configurations.

TABLE 2

|  | Inductance: Max | Inductance: Min | Ratio |
|---|---|---|---|
| Composite | 168 | 78 | 2.15 |
| Dual neo consequent (FIG. 3) | 165 | 77 | 2.14 |
| Consequent Tee (FIG. 7) | 162 | 76.5 | 2.12 |

The following table 3 illustrates the peak NM torque, the average NM torque and at 3.5 amps DC of the composite, dual neo consequent and consequent Tee configurations.

TABLE 3

|  | Peak NM Torque | Average NM Torque |
|---|---|---|
| Composite | 2.87 | 1.18 |
| Dual neo consequent (FIG. 3) | 2.74 | 1.16 |
| Consequent Tee (FIG. 7) | 2.72 | 1.14 |

In yet another embodiment, the present invention is a method of manufacturing an IPM motor having a rotor wherein a ferrite magnet and a neo magnet are both located in an opposing pair of first composite slots and only a ferrite magnet is located in another opposing pair of second non-composite slots. The pair of opposing first composite slots is formed in the rotor core so that the longitudinal axis A is located between the first composite slots. The pair of opposing second non-composite slots is formed in the rotor core so that the longitudinal axis A is located between the second non-composite slots. A first magnet is inserted in each of the first and second slots. A second magnet is inserted in each of the first composite slots only so that the second magnet is positioned between the first magnet and an outer surface of the core. The rotor core is inserted into a stator having windings connected to a commutation circuit. The slots may be precisely complementary to the outline of the magnet or magnets therein so as to minimize air spaces, or it may have a trapezoidal area around the rectangular neo magnet, or it may have end slots or end openings. The rotor core is secured within the stator and the commutation circuit energizes the windings. A magnetic field of the stator interacts with the magnets in the rotor causing the rotor to turn.

It is contemplated that aspects of the embodiments described above may be combined in numerous ways without deviating from the invention. For example, the embodiment shown in FIG. 6 may use a precision slot instead of a trapezoidal slot, or the embodiment shown in FIG. 5 may use a trapezoidal slot. FIGS. 1-7 show 4 slots having magnets in them, but the rotor may have any number of slots, some of which may be empty. Also, the same rotor may contain more than one configuration of neo and ferrite magnets. The central shaft shown in the above embodiments may be cast, forged, or machined as part of the core or engage the core by some other means such as splining. Additionally, any of the rotor configurations may have lobed cores as shown in FIG. 1.

Some embodiments of the invention have advantages over other embodiments. For example, using two rectangular (i.e., viewed in cross section) pieces of neo magnet allows small air spaces than one larger piece of neo magnet because they better conform to the curvature of the ferrite magnet. Embodiments of the invention utilizing a trapezoidal slot will generally have a higher maximum inductance than embodiments utilizing a precision slot because a precision slot tends to increase leakage flux. Embodiments using lobed rotor cores generally have a lower cogging torque and more sinusoidal back EMF than embodiments using rotor cores. Also, embodiments with a neo magnet further from the center of the rotor than the ferrite magnet tend to develop a higher maximum inductance than embodiments with neo magnets closer to the center than the ferrite magnet.

The above description is also applicable to other motor configurations such as inside out motors and/or motors having windings in the rotor and permanent magnets in the stator, and visa versa. For example, embodiments of the invention in an inside out motor include neo and ferrite magnets located in a single slot. Magnet configurations and air space considerations are similar to those of the above described rotor designs.

This description refers to ferrite and neo throughout, but one skilled in the art will recognize that magnetic materials other than neo and ferrite may be used without deviating from the invention and more than one piece of neo and/or ferrite may be used in each slot. One skilled in the art will also notice that different shapes of neo magnets, ferrite magnets, and slots are possible without deviating from the invention. The rotor core may be made with steel or some other material. The description refers to an IPM motor rotor throughout, but one skilled in the art knows that an electric motor may be configured as a generator.

Having described the invention in detail, it will be apparent that modifications and variations are possible without departing from the scope of the invention defined in the appended claims.

The order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein. For example, it is contemplated that executing or performing a particular element before, contemporaneously with, or after another element is within the scope of the various embodiments of the invention.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description and shown in the accompanying drawings shall be interpreted as illustrative and not in a limiting sense.

What is claimed is:

1. An electric motor rotor comprising:
    a core having a central longitudinal axis, said core having a pair of opposing first slots radially spaced from the longitudinal axis and extending parallel to the axis wherein said longitudinal axis is positioned between the pair of first slots, said core having a pair of opposing second slots radially spaced from the longitudinal axis and extending parallel to the axis wherein said longitudinal axis is positioned between the pair of second slots, wherein the first slots are not angularly aligned with the second slots with respect to the longitudinal axis such that in a cross section of the rotor perpendicular to the longitudinal axis of the rotor, the first slots are not in a line through the longitudinal axis with the second slots;
    first magnets extending parallel to the longitudinal axis, said first magnets positioned in the first slots and positioned in the second slots; and
    second magnets extending parallel to the longitudinal axis, said second magnets positioned in the first slots only such that a cross section of the rotor perpendicular to the longitudinal axis of the rotor is asymmetrical with respect to a line perpendicular to the central longitudinal axis positioned evenly between the first slots and the second slots, wherein the second magnets are positioned between the first magnets and an outer surface of the core, and wherein the second magnets are a different material than the first magnets.

2. The rotor of claim 1 wherein the outer surface is parallel to said longitudinal axis, said outer surface having a lobe.

3. The rotor of claim 2 farther comprising an air space adjacent to at least one of the first or second magnets.

4. The rotor of claim 2 wherein the first slot each comprise an arc-shaped slot having ends which terminate in a rectangular slot, wherein the second slots each comprise an arc-shaped slot, wherein the first magnets are positioned in the arc-shaped slots and wherein the second magnets are positioned with the rectangular slots to form an air gap between the first magnets and the second magnets.

5. The rotor of claim 1 wherein, when viewed in cross section, the first magnet is arch-shaped, having a convex surface facing the central longitudinal axis and a concave surface facing the second magnet.

6. The rotor of claim 5 wherein at least one of the following:
    (1) when viewed in cross section, the second magnet has a convex surface generally complementary to and in contact with the concave surface of the first magnet; and
    (2) when viewed in cross section, at least a portion of the first magnet contacts the concave surface of the second magnet.

7. The rotor of claim 1:
    (a) wherein said core has end slots which are contiguous with the first slots and form an air space; or
    (b) wherein said core has end openings adjacent to the first slots and spaced from the first slots so that the end openings are not contiguous with the first slots, said end openings forming an air space.

8. The rotor of claim 7 wherein said end slots comprise elongated slots radially spaced from the longitudinal axis and extending tangentially relative to the outer surface of the core.

9. The rotor of claim 1 wherein the first magnets are strontium ferrite, wherein the second magnets are neodymium-iron-boron, and wherein the core is steel.

10. An electric motor comprising:
    a rotor including:
        a core having a central longitudinal axis, said core having a pair of opposing first slots radially spaced from the longitudinal axis and extending parallel to the axis wherein said longitudinal axis is positioned between the pair of first slots, said core having a pair of opposing second slots radially spaced from the longitudinal axis and extending parallel to the axis wherein said longitudinal axis is positioned between the pair of second slots, wherein the first slots are not angularly aligned with the second slots with respect to the longitudinal axis such that in a cross section of the rotor perpendicular to the longitudinal axis of the rotor, the first slots are not in a line through the longitudinal axis with the second slots;
        first magnets extending parallel to the longitudinal axis, said first magnets positioned in the first slots and positioned in the second slots; and
        second magnets extending parallel to the longitudinal axis, said second magnets positioned in the first slots only such that a cross section of the rotor perpendicular to the longitudinal axis of the rotor is asymmetrical with respect to a line perpendicular to the central longitudinal axis positioned evenly between the first slots and the second slots, wherein the second magnets are positioned between the first magnets and an outer surface of the core, and wherein the second magnets are a different material than the first magnets;
    a stator in magnetic coupling relation to the rotor having windings; and
    a commutation circuit electrically connected to the windings of the stator.

11. The rotor of claim 10 wherein the outer surface is parallel to said longitudinal axis, said outer surface having a lobe.

12. The rotor of claim 10 further comprising an air space adjacent to at least one of the first or second magnets.

13. The rotor of claim 12 wherein the first slot each comprise an arc-shaped slot having ends which terminate in a rectangular slot, wherein the second slots each comprise an arc-shaped slot, wherein the first magnets are positioned in the arc-shaped slots and wherein the second magnets are positioned with the rectangular slots to form an air gap between the first magnets and the second magnets.

14. The rotor of claim 10 wherein, when viewed in cross section, the first magnet is arch-shaped, having a convex surface facing the central longitudinal axis and a concave surface facing the second magnet.

15. The rotor of claim 10 wherein at least one of the following:
  (1) when viewed in cross section, the second magnet has a convex surface generally complementary to and in contact with the concave surface of the first magnet; and
  (2) when viewed in cross section, at least a portion of the first magnet contacts the concave surface of the second magnet.

16. The rotor of claim 10:
  (a) wherein said core has end slots which are contiguous with the first slots and form an air space; or
  (b) wherein said core has end openings adjacent to the first slots and spaced from the first slots so that the end openings are not contiguous with the first slots, said end openings forming an air space.

17. The rotor of claim 16 wherein said end slots comprise elongated slots radially spaced from the longitudinal axis and extending tangentially relative to the outer surface of the core.

18. The rotor of claim 10 wherein the first magnets are strontium ferrite, wherein the second magnets are neodymium-iron-boron, and wherein the core is steel.

19. An electric motor rotor comprising:
  a core having a central longitudinal axis, said core having a pair of opposing first slots radially spaced from the longitudinal axis and extending parallel to the axis wherein said longitudinal axis is positioned between the pair of first slots, said core having a pair of opposing second slots radially spaced from the longitudinal axis and extending parallel to the axis wherein said longitudinal axis is positioned between the pair of second slots, wherein the first slots are not angularly aligned with the second slots with respect to the longitudinal axis such that in a cross section of the rotor perpendicular to the longitudinal axis of the rotor, the first slots are not in a line through the longitudinal axis with the second slots;
  first magnets extending parallel to the longitudinal axis, said first magnets positioned in the first slots and positioned in the second slots; and
  second magnets extending parallel to the longitudinal axis, said second magnets positioned in the first slots only such that a cross section of the rotor perpendicular to the longitudinal axis of the rotor is asymmetrical with respect to a line perpendicular to the central longitudinal axis positioned evenly between the first slots and the second slots, wherein the second magnets are positioned between the first magnets and an outer surface of the core, and wherein the second magnets are a different material than the first magnets;
  wherein:
  (a) said core having end slots which are contiguous with the first and second slots and form an air space; or
  (b) said core having end openings adjacent to the first and second slots and spaced from the first and second slots, respectively, so that the end openings are not contiguous with the first slots and the second slots, said end openings forming an air space.

20. The rotor of claim 19 wherein said end slots comprise elongated slots radially spaced from the longitudinal axis and extending tangentially relative to the outer surface of the core.

* * * * *